F. G. Bottner.
Slate Pencil Sharpener.

Nº 67,488.     Patented Aug. 6, 1867.

Witnesses.
J. A. Service
Theo Tusche

Inventor
F. G. Bottner
Per Munn & Co
Atts.

United States Patent Office.

F. G. BOTTNER, OF BRIDGEPORT, CONNECTICUT.

Letters Patent No. 67,488 dated August 6, 1867.

SLATE-PENCIL SHARPENER.

*The Schedule referred to in these Letters Patent and making part of the same.*

TO ALL WHOM IT MAY CONCERN:

Be it known that I, F. G. BOTTNER, of Bridgeport, in the county of Fairfield, and State of Connecticut, have invented a new and Improved Slate-Pencil Sharpener; and I do hereby declare that the following is a full, clear, and exact description thereof, which will enable others skilled in the art to make and use the same, reference being had to the accompanying drawings, forming part of this specification, in which—

Similar letters of reference indicate like parts.

Figure 1:
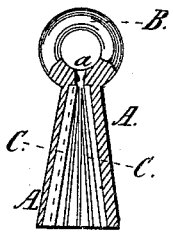
Figure 1 is a side view, partly in section, of my improved slate-pencil sharpener.
Figure 2:
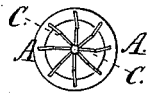
Figure 2 is an inverted plan view of the same.

The object of this invention is to provide an article whereby slate-pencils may be pointed with ease and facility, and which can be used by children or others without being easily injured or brought out of order by being used for the purposes for which it is intended.

The invention consists in the use of a conical shell, within which a number of radiant cutters are arranged, so that the end of a slate-pencil, when inserted into the broad end of the instrument, will be gradually pointed between the converging cutters.

A is a conical shell, made of lead or other suitable material, and above the apex of which a ring, B, is arranged, which serves as a handle for the instrument. C C are a number of cutters, made of steel or other suitable material, arranged within the shell, and secured to the inner side of the same in any suitable manner. On account of the conical shape of the shell the cutters converge towards the apex of the cone, but do not quite meet in a point, a small hole, $a$, being left, so that the point of a slate-pencil cannot be easily broken off when within the instrument, and that the same can be easily removed when broken and retained in the instrument. The shell may be slotted between the cutters, so that the flour ground off can pass out, and not clog the apparatus.

Having thus described my invention, I claim as new, and desire to secure by Letters Patent, as an improved article of manufacture.

A slate-pencil sharpener, made and operating substantially as and for the purpose herein shown and described.

F. G. BOTTNER.

Witnesses:
    LOUIS HUTH,
    JOSHUA LORD.